US005427998A

United States Patent [19]

Umemura et al.

[11] Patent Number: 5,427,998

[45] Date of Patent: Jun. 27, 1995

[54] METHOD FOR PREPARING A THERMAL TRANSFER IMAGE-RECEIVING SHEET INVOLVING A POLYCARBONATE DYE-RECEIVING LAYER

[75] Inventors: Toshikazu Umemura; Satoshi Kanayama, both of Osaka, Japan

[73] Assignee: Mitsubishi Gas Chemical Co., Ltd., Japan

[21] Appl. No.: 262,364

[22] Filed: Jun. 20, 1994

Related U.S. Application Data

[63] Continuation of Ser. No. 974,464, Nov. 12, 1992, abandoned.

[30] Foreign Application Priority Data

Nov. 12, 1991 [JP] Japan .................................. 3-295668
Nov. 12, 1991 [JP] Japan .................................. 3-295669

[51] Int. Cl.$^6$ ........................ B41M 5/38; B01J 27/135

[52] U.S. Cl. .................................... 503/227; 524/356; 524/361; 524/611; 528/171; 528/174; 528/202; 528/204

[58] Field of Search ................ 503/227; 528/204, 171, 528/174, 202; 524/611, 356, 361

[56] References Cited

U.S. PATENT DOCUMENTS 4,515,937 5/1985 Baron et al. ........................ 528/204
4,748,151 5/1988 Murata et al. ...................... 503/227

FOREIGN PATENT DOCUMENTS 0084578 8/1983 European Pat. Off. .
3626422 2/1987 European Pat. Off. .

*Primary Examiner*—John Kight, III
*Assistant Examiner*—Terressa Mosley
*Attorney, Agent, or Firm*—Sughrue, Mion, Zinn, Macpeak & Seas

[57] ABSTRACT

A polycarbonate resin solution for forming a thermal-sublimating dye-receiving layer film, comprising a random copolycarbonate resin dissolved in an organic solvent, the resin having a structural unit represented by following formula (1) and a structural formula represented by following formula (2) or (3), the molar ratio of the structural unit represented by formula (1) to the structural unit represented by formula (2) or (3) being from 35/65 to 65/35, and having a number average molecular weight of from 5,000 to 50,000.

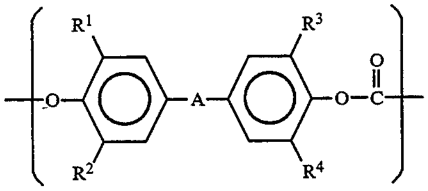

(1)

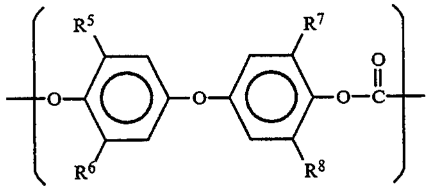

(2)

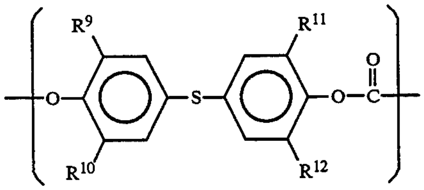

(3)

wherein $R^1$ to $R^{12}$ each represents a hydrogen atom, a halogen atom, or an alkyl group having from 1 to 4 carbon atoms and in formula (1), A represents a straight chain, branched, or cyclic alkylidene group having from 1 to 10 carbon atoms, an aryl-substituted alkylidene group, an arylene group, or a sulfonyl group.

13 Claims, No Drawings

METHOD FOR PREPARING A THERMAL TRANSFER IMAGE-RECEIVING SHEET INVOLVING A POLYCARBONATE DYE-RECEIVING LAYER

This is a Continuation of application Ser. No. 07/974,464 filed Nov. 12, 1992, now abandoned.

FIELD OF THE INVENTION

The present invention relates to a polycarbonate resin solution for forming a thermal-sublimating dye receiving layer film, and in particular, to a polycarbonate resin solution for forming a thermal-sublimating dye receiving layer film, which can form a resin film of an acceptor which does not lose surface luster after transfer-recording with thermal printing heads and is stable and excellent in productivity without need of using a halogenated solvent.

BACKGROUND OF THE INVENTION

In a thermal-sublimating dye transfer system, a recorded image is obtained by sending image information converted into electric signals to a linear type thermal printing head, and heat is generated from the back side of a dye-providing film to sublimate a dye, thereby dyeing an acceptor facing the dye-providing film with the dye.

As a material for a dye-receiving layer of the acceptor in such a heat-transfer recording system, a saturated polyester resin, polymethyl methacrylate, polybutyl methacrylate, polystyrene, an acrylonitrile-styrene (AS) resin, polyvinyl chloride, polyvinyl acetate, etc., are known. In particular, the saturated polyester resin, the acrylic resins, and the vinyl chloride resin have an excellent affinity with sublimating dyes. However, in the dye-receiving layers using these resins, the surface thereof is deformed by heating and pressing in a gap between the thermal printing heads and a rubber roller and an unevenness formed by the deformation sometimes gives an undesirable difference in the luster of the image formed.

For overcoming the problem, JP-A-62-169694 (the term "JP-A" as used herein means an "unexamined published Japanese patent application") discloses a dye-receiving layer using a polycarbonate resin having a number average molecular weight of at least 25,000. The polycarbonate resin has an advantage that image recording having a beautiful luster without having deformation of the surface caused by heat printing heads is obtained. However, when the dye-receiving layer using the resin is formed on a base film by coating, it is necessary to use a halogenated solvent such as methylene chloride as a solvent for dissolving the resin. Hence such a method is undesirable from the standpoint of environmental pullution.

Also, a polycarbonate resin, in particular a polycarbonate resin prepared using bisphenol A as the raw material, has a disadvantage that if a solution of the resin is allowed to stand for from 3 to 4 days, the solution begins to become white turbid, and it is necessary to use the solution of the resin having a very low concentration or to re-dissolve the turbid solution for forming a dye-receiving layer by a coating method, which reduces greatly the production efficiency. On the other hand, a polycarbonate resin having a number average molecular weight of 25,000 or more has a disadvantage that since a solution of the resin is liable to become very highly viscous, it is necessary to dilute the resin solution to a low concentration of lower than 10% by weight, and preferably lower than 5% by weight, for forming a dye-receiving layer by a coating method. Hence, a large amount of a solvent must be used.

SUMMARY OF THE INVENTION

Accordingly, an object of the present invention is to provide a dye-receiving layer comprising a polycarbonate resin, which does not lose luster of the surface of an acceptor after transfer recording by thermal printing heads and has excellent mechanical characteristics.

Another object of the present invention is to provide a polycarbonate resin solution for forming a film of a thermal sublimating dye-receiving layer, the resin solution being stable and excellent in productivity without need of using a halogenated solvent in the case of forming the dye-receiving layer on a base film by coating.

The present invention attains the above-described objects by using a specific polycarbonate resin solution.

That is, according to the present invention, there is provided a polycarbonate resin solution for forming a thermal sublimating dye-receiving layer film, comprising a random copolycarbonate resin dissolved in an organic solvent, the resin having a structural unit represented by following formula (1) and a structural unit represented by following structural unit (2) or a structural unit represented by following formula (3), the mol ratio of the structural unit represented by formula (1) to the structural unit represented by formula (2) or formula (3) being from 35/65 to 65/35, and having a number average molecular weight of from 5,000 to 50,000;

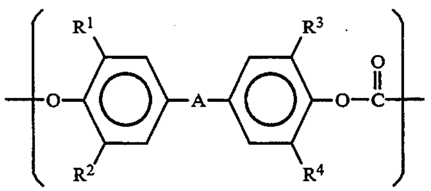

(1)

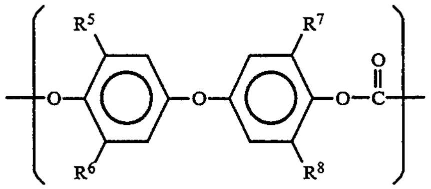

(2)

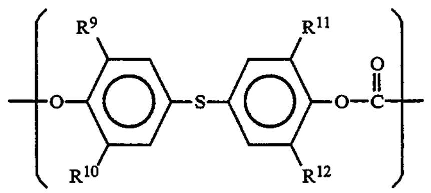

(3)

wherein $R^1$ to $R^{12}$ each represents a hydrogen atom, a halogen atom, or an alkyl group having from 1 to 4 carbon atoms and A in formula (1) represents a straight chain, branched, or cyclic alkylidene group having from 1 to 10 carbon atoms, an aryl-substituted alkylene group, an arylene group, or a sulfonyl group.

DETAILED DESCRIPTION OF THE INVENTION

The polycarbonate resin used in the present invention is a polycarbonate resin having a number average molecular weight of from 5,000 to 50,000, and preferably from 5,000 to 25,000, and having randomly the structural unit of the above-described formula (1) and the structural unit of formula (2) or formula (3), obtained by copolymerizing a dihydric phenol compound represented by following formula (4) and a dihydric phenol compound represented by following formula (5) or a dihydric phenol compound represented by following formula (6) together with phosgene, a carbonic acid ester, or chloroformate.

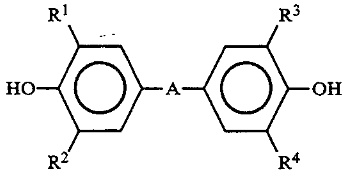
(4)

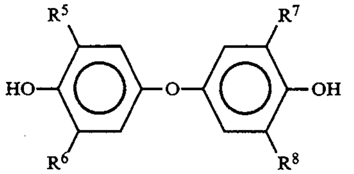
(5)

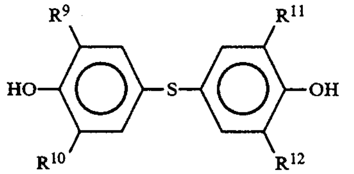
(6)

wherein $R^1$ to $R^{12}$ and A are the same as defined above.

The reaction molar ratio of the dihydric phenol compound shown by formula (4) to the dihydric phenol compound shown by formula (5) or formula (6) is from 35/65 to 65/35. If the molar ratio is outside the above range, in the step of dissolving the polycarbonate resin in a solvent the resulting solution becomes turbid or the stability of the solution is lowered.

By randomly copolymerizing the above components, the micro-dispersion of the polycarbonate resin becomes uniform as compared with a block copolymer, whereby the resin solution obtained is improved in properties such as the optical property, the solution stability, etc., as well as in the point of stress crack. The anti-stress crack property has an important effect on the storage stability of recorded images in the case that cosmetics, an edible oil, etc., become deposited on the dye-receiving layer after image transfer images.

If the number average molecular weight of the polycarbonate resin is less than 5,000, the strength of the film formed by a coating method is insufficient and if the molecular weight thereof exceeds 50,000, the production efficiency by a coating method is decreased.

Examples of the dihydric phenol compound shown by formula (4), which is used as the raw material for the copolycarbonate resin in the present invention are bis(4-hydroxyphenyl)methane, 1,1-bis(4-hydroxyphenyl)ethane, 2,2-bis(4-hydroxyphenyl)propane (=bisphenol A; BPA), 2,2-bis(4-hydroxyphenyl)butane, 1,1-bis(4-hydroxyphenyl)cyclohexane (=bisphenol Z; BPZ), 2,2-bis(4-hydroxy-3,5-dimethylphenyl)propane, 2,2-bis(4-hydroxy-3,5-dibromophenyl)propane, 2,2-bis(4-hydroxy-3,5-dichlorophenyl)propane, 2,2-bis(4-hydroxy-3-methylphenyl)propane (=dimethylbisphenol A; DMBPA), 2,2-bis(4-hydroxy-3-bromophenyl)propane, 2,2-bis(4-hydroxy-3-chlorophenyl)propane, 1,1-bis(4-hydroxyphenyl)-1-phenylethane, bis(4-hydroxyphenyl)diphenylmethane, and bis(4-hydroxyphenyl)sulfone.

In these compounds, 2,2-bis(4-hydroxyphenyl)propane, 1,1-bis(4-hydroxyphenyl)cyclohexane, 1,1-bis(4-hydroxyphenyl)-1-phenylethane, 2,2-bis(4-hydroxy-3-methylphenyl)propane, and bis(4-hydroxyphenyl)sulfone are preferable, and 2,2-bis(4-hydroxyphenyl)propane and 1,1-bis(4-hydroxyphenyl)cyclohexane are particularly preferable in the point of heat stability.

Examples of the dihydric phenol compound shown by formula (5), which is used as the raw material for the copolycarbonate resin in the present invention are bis(4-hydroxyphenyl) ether (=4,4-dihydroxy diphenyl ether; DHPE), bis(3-methyl-4-hydroxyphenyl) ether (=3,3'-dimethyl-4,4'-dihydroxy phenyl ether; DMDHPE), bis(3-bromo-4-hydroxyphenyl) ether, bis(3-chloro-4-hydroxyphenyl) ether, bis(3,5-dimethyl-4-hydroxyphenyl) ether, bis(3,5-dibromo-4-hydroxyphenyl) ether, and bis(3,5-dichloro-4-hydroxyphenyl) ether.

In these compounds, bis(4-hydroxyphenyl) ether is preferable.

Examples of the dihydric phenol compound shown by formula (6), which is used as the raw material for the copolycarbonate resin in the present invention are bis(4-hydroxy) sulfide (TDP), bis(3-methyl-4-hydroxyphenyl) sulfide (DMTDP), bis(3-bromo-4-hydroxyphenyl) sulfide, bis(3-chloro-4-hydroxyphenyl) sulfide, bis(3,5-dimethyl-4-hydroxyphenyl) sulfide, bis(3,5-dibromo-4-hydroxyphenyl) sulfide, and bis(3,5-dichloro-4-hydroxyphenyl) sulfide.

In these compounds, bis(4-hydroxyphenyl) sulfide is preferable.

Furthermore, in the case of producing the copolycarbonate resin in the present invention, a chain terminator or a molecular weight modifier can usually be used. Examples thereof are compounds having a monohydric phenolic hydroxy group, and specific examples thereof are phenol, p-tertiary butylphenol, and tribromophenol as well as long chain alkylphenols, aliphatic carboxylic acid chlorides, aliphatic carboxylic acids, hydroxybenzoic acid alkyl esters, hydroxyphenyl alkyl esters, and alkyl ether phenols. The amount of the compound used is from 100 to 0.5 mol, and preferably from 50 to 2 mols, per 100 mols of the whole dihydric phenol compounds. As a matter of course, two or more kinds of these compounds can be used.

A branching agent can also be used, and by using the branching agent together with the above dihydric phenol compounds in an amount of from 0.01 to 3 mol %, and in particular from 0.1 to 1.0 mol %, per mole of the dihydric phenol compounds, a branched polycarbonate can be obtained. Examples of the branching agent are polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzol, 1,1,1-tri(4-hydroxyphenyl)ethane, 2,6-bis(2-hydroxy-5-methylbenzyl)-4-methylphenol, $\alpha,\alpha',\alpha''$-tri(4-hydroxyphenyl-1,3,5-triisopropylbenzene, etc., 3,3-bis(4-hydroxyaryl)oxyindole (=isatin bisphenol), 5-chloroisatin, 5,7-dichloroisatin, and 5-bromoisatin.

As the solvent used for the polycarbonate resin of the present invention, any solvents which dissolve the polycarbonate resin of the present invention and have a proper volatility can be used and, for example, halogen series solvents such as chlorobenzene, methylene chloride, etc., can be, as a matter of course, used.

In consideration of the safe sanitation at coating, non-halogen series solvents, in particular hydrocarbon series solvents such as methyl ethyl ketone, toluene, xylene, ethylbenzene, etc., are preferably used.

The concentration of the polycarbonate resin solution of the present invention is usually from 1 to 30% by weight, and preferably from 5 to 20% by weight.

The polycarbonate resin in the present invention has an advantage that the resin has a high solubility for a non-halogen series solvent such as toluene, etc., and the stability of the solution is highly different from general polycarbonate resins.

As the base film for forming thereon the dye-receiving layer using the polycarbonate resin solution of the present invention, various kinds of papers formed from cellulose fibers, films of plastics such as polyethylene, polypropylene, polyester, etc., and a laminate of a paper and a plastic film can be used. Also, these plastic films can contain compounded therewith a white pigment such as titanium oxide, zinc oxide, etc.

As a method of forming a dye-receiving layer on a base film using the polycarbonate resin solution of the present invention, a coating method is preferable.

Practically, there are a method of coating the polycarbonate resin solution of the present invention by a dip coating method or a flow coating method followed by drying to provide the acceptor and a method of coating the polycarbonate resin solution by a roll coater or a gravure coater.

The thickness of the dye-receiving layer is from 1 to 50 μm, and preferably from 5 to 20 μm.

A heat transfer sheet having a color material layer containing a thermal-sublimating dye, which is used in a face-to-face state with the thermal-sublimating dye-receiving layer of the thermal transfer image-receiving sheet is one prepared by forming a dye layer containing a thermal-sublimating dye on a base material, e.g., a plastic film having heat resistance, such as a polyester film, a polycarbonate film, etc., and a paper, and conventional heat-transfer sheets can be used as the heat-transfer sheet.

Then, the present invention is described in more detail by the following examples.

The molecular weight of each of the polycarbonate resins in the following examples, etc., was measured as follows using GPC (Gel Permeation Chromatography).

Molecular weight herein was calculated by the following formula.

$$K_1 Mnpc^{(a1+1)} = K_2 Mnps^{(a2+1)}$$

Mnpc: Number average molecular weight of polycarbonate.

Mnps: Number average molecular weight of polystyrene.

$K_1$, a1: Constants of polycarbonate $K_1 3.89\times10^4$ $a1=0.70$ $K_2$, a2: Constants of polystyrene $K_2=1.11\times10^4$ $a2=0.725$

EXAMPLE 1

In 42 liters of water was dissolved 3.7 kg of sodium hydroxide and while keeping the solution at 20° C., 3.65 kg of bisphenol A (BPA), 3.23 kg of 4,4'-dihydroxydiphenyl ether (DHPE), and 8 g of hydrosulfide (HD) were dissolved in the solution.

To the solution thus obtained was added 28 liters of methylene chloride and after further adding thereto 148 g of p-t-butylphenol (PTBP) with stirring, 3.5 kg of phosgene (PG) was blown into the mixture over a period of 60 minutes. The reaction mixture was emulsified by stirring vigorously and 8 g of triethylamine (TEA) was then added thereto followed by stirring for about one hour to carry out the polymerization.

The polymer solution thus obtained was separated into an aqueous phase and an organic phase, and the organic phase was recovered and neutralized with phosphoric acid. After repeating water washing until the washed solution became neutral, 35 liters of isopropanol was added to the organic phase to precipitate the polymerized product. By recovering the precipitates by filtration and drying, a white powdery polycarbonate resin was obtained.

The polycarbonate resin powder obtained was dissolved in toluene at a concentration of 10% by weight. The resin solution was coated on a polyester (PET) film (thickness of 150 μm) containing a white pigment ($TiO_2$) and dried at 120° C. for 30 minutes to form a dye-receiving layer having a thickness of from 5 to 10 μm.

A dye-providing film was prepared by coating a coating composition of a magenta dye on a PET film of 100 μm in thickness at a thickness of 1 μm, the dye-providing film was superposed on the resin-coated film such that the dye-containing layer faced the dye-receiving layer, and an electric voltage was applied to thermal printing heads to heat the back surface of the dye-providing film, whereby the dye was sublimated and transferred into the resin layer.

The heating time of the resistant elements of the thermal printing heads was about 8 milli-seconds, the voltage was about 22 volts, and the maximum electric power was about 1.5 watts/dot.

The image-formed film obtained was allowed to stand in a hot blast dryer at 100° C. for 24 hours and the density change of the dye was determined. Also, 200 g of a weight was hung on the dye-formed film, the assembly was allowed to stand for 24 hours in a toluene atmosphere, and the presence of the occurrence of fine craze on the surface was determined.

The results obtained are shown in Table 1 below.

EXAMPLES 2 TO 5

The same procedure as in Example 1 was followed except that the amounts of the dihydric phenol compounds shown by formula (4) and formula (5) were changed as shown in Table 1 below.

The results obtained are shown in Table 1 below.

COMPARATIVE EXAMPLE 1

The same procedure as in Example 1 was followed except that 7.3 kg of BPA was used in place of 3.65 kg of BPA and 3.23 kg of DHPE.

The results obtained was shown in Table 1 below.

COMPARATIVE EXAMPLE 2

(1) Production of Polycarbonate Oligomer:

In 1.8 liters of water was dissolved 1.6 kg of sodium hydroxide and while keeping the solution at 20° C., 3.65 kg of BPA and 4 g of HD were dissolved in the solution. To the solution obtained was added 14 liters of MC and after adding thereto 64 g of PTBP with stirring, 2.4 kg of PG was blown into the mixture. Only the MC solution containing the polycarbonate oligomer was collected. The analytical results of the MC solution of the oligomer obtained were as follows.

Oligomer Concentration (*1): 29.4% by weight

Terminal C1 Group Concentration (*2): 6.5%

Terminal Phenolic Hydroxy Group Concentration (*3): 0.01%

(*1): Measured by evaporation to dryness.

(*2): The aniline hydrochloride obtained by reacting with aniline by a neutralization titration with an aqueous solution of 0.2N NaOH.

(*3): Coloration in the case of dissolving in an acetic acid solution of titanium tetrachloride was measured by a colorimetry at 546 nm.

(2) Production of Polycarbonate Oligomer:

The oligomer solution obtained by the above method is designated as oligomer solution A.

The same procedure as in production (1) above was followed except that 3.23 kg of 4,4'-dihydroxydiphenyl ether (DHPE) was used in place of BPA. The analytical results of the MC solution of the oligomer obtained were as follows.

Oligomer Concentration: 26.0% by weight

Terminal C1 Group Concentration: 7.0%

Terminal Phenolic Hydroxy Group Concentration: 0.01%

The oligomer solution obtained in the above method is designated as oligomer solution B.

(3) Production of Block Copolymerized Polycarbonate:

The whole amount of oligomer solution A obtained above, the whole amount of oligomer solution B obtained above, 4 liters of MC, and 20 g of PTBP were supplied to a reaction vessel. To the mixture was added a solution of 1.0 kg of sodium hydroxide dissolved in 18 liters of water followed by stirring vigorously to emulsify the reaction mixture formed, and 8 g of TEA was then added to the emulsion followed by stirring for about one hour to carry out the polymerization.

The polymer solution formed was separated into an aqueous phase and an organic phase. The organic phase was recovered and neutralized with phosphoric acid. After repeating washing with water until the washed water became neutral, 35 liters of isopropanol was added to the reaction mixture to precipitate the polymerized product. By recovering the precipitates by filtration and drying, a white powdery polycarbonate resin was obtained.

The results of using the block copolymerized polycarbonate as a dye-receiving layer are shown in Table 1 below.

COMPARATIVE EXAMPLES 3 AND 4

The same procedure as in Example 1 was followed except that the amounts of BPA and DHBE were changed as shown in Table 1.

The results obtained are shown in Table 1 below.

TABLE 1

| No. | Dihydric Phenol*1 Phenol of Formula (4) (mole %) | Phenol of Formula (5) (mole %) | Remarks | Number Average Molecular Weight × $10^4$ | Film-Forming Property*2 Solubility (%) | Solution Stability*3 | Solution Turbidity*4 | Random Property*5 | Stress Crack*6 | Heat Resistance*7 Density Holding Ratio at 100° C. for 24 hrs. (%) |
|---|---|---|---|---|---|---|---|---|---|---|
| EX 1 | BPA 50 | DHPE 50 | | 1.0 | >20 | ○ | ○ | ○ | ○ | 90 |
| EX 2 | BPZ 40 | DHPE 60 | | 3.2 | >20 | ○ | ○ | ○ | ○ | 93 |
| EX 3 | BPAP 60 | DHPE 40 | | 0.8 | >20 | ○ | ○ | ○ | ○ | 88 |
| EX 4 | DMBPA 50 | DHPE 50 | | 2.1 | >20 | ○ | ○ | ○ | ○ | 90 |
| EX 5 | BPA 50 | DMDHPE 50 | | 2.0 | >20 | ○ | ○ | ○ | ○ | 90 |
| CE 1 | BPA 100 | | | 1.1 | <0.1 | — | x | — | x | 65 |
| CE 2 | BPA 50 | DHPE 50 | Block Copolymer | 1.0 | >20 | x | ○ | x | x | 68 |
| CE 3 | BPA 20 | DHPE 80 | | 2.0 | >20 | — | x | x | ○ | 70 |
| CE 4 | BPA | DHPE | | 0.4 | >20 | ○ | ○ | ○ | x | 68 |

TABLE 1-continued

| No. | Dihydric Phenol*1 Phenol of Formula (4) (mole %) | Phenol of Formula (5) (mole %) | Remarks | Number Average Molecular Weight × $10^4$ | Film-Forming Property*2 Solubility (%) | Solution Stability*3 | Solution Turbidity*4 | Random Property*5 | Stress Crack*6 | Heat Resistance*7 Density Holding Ratio at 100° C. for 24 hrs. (%) |
|---|---|---|---|---|---|---|---|---|---|---|
| | 50 | 50 | | | | | | | | |

EX Example
CE Comparison Example
In Table 1 above, (*1) to (*7) are as follows.
(*1): Dihydric Phenols:
BPA: Bisphenol A
BPZ: 1,1-Bis(4-hydroxyphenyl)cyclohexane
BOAP: 1,1-Bis(4-hydroxyphenyl)-1-phenylethane
DMBPA: Dimethylbisphenol A
DHPE: 4,4'-Dihydroxydiphenyl ether
DMDHPE: 3,3'-Dimethyl-4,4'-dihydroxydiphenyl ether
(*2): Film-Forming Property: The solvent used for the evaluation was toluene.
(*3): Solution Stability: Presence or absence of turbidity of the 10% toluene solution of each resin after one week. Found (x), None (∘)
(*4): Solution Turbidity: Presence or absence of turbidity at the preparation of the 10% toluene solution of each resin. Found (x), None (∘)
(*5): Random Property: Presence or absence of fibrous ununiform unevenness by TEM (Transmission Electron Microscopy) observation result. Found (x), None (∘)
(*6): Stress Crack: Presence or absence of the occurrence of craze under hanging of 200 g of weight on each film (load 100 kg/$cm^2$) for 24 hours in toluene atmosphere. Found (x), None (∘)
(*7): Heat Resistance: L Value holding ratio in the case of evaluating the dye densities before and after allowing to stand each image film in a dryer for 24 hours at 100° C. by L, a and b values of a color-difference meter.

EXAMPLE 6

In 42 liters of water was dissolved 3.7 kg of sodium hydroxide and while keeping solution at 20° C., 3.65 kg of bisphenol A (BPA), 3.49 kg of bis(4-hydroxyphenyl) sulfide (=4,4'-dihydroxydiphenyl sulfide; TDP), and 8 g of hydrosulfide (HD) were dissolved in the solution.

To the solution obtained was added 28 liters of methylene chloride (MC) and after further adding thereto 148 g of p-t-butylphenol (PTBP) with stirring, 3.5 kg of phosgene (PG) was blown into the mixture over a period of 60 minutes. The reaction mixture was emulsified with stirring vigorously and 8 g of triethylamine (TEA) was then added to the emulsion followed by stirring for one hour to carry out the polymerization.

The polymer solution thus obtained was separated into an aqueous phase and an organic phase. The organic phase was recovered and neutralized with phosphoric acid, and after repeating water washing until the washed water became neutral, 35 liters of isopropanol was added to the organic phase to precipitate the polymerized product. By collecting the precipitates by filtration and drying, a white powdery polycarbonate resin was obtained.

The polycarbonate resin powder obtained was dissolved in toluene at a concentration of 10%. The resin solution was coated on a polyester (PET) film (thickness 150 μm) containing a white pigment ($TiO_2$) and dried at 120° C. for 30 minutes to form a dye-receiving layer having a thickness of from 5 to 10 μm.

A dye-providing film was prepared by coating a coating composition of a magenta dye on a PET film of 100 μm in thickness at a thickness of 1 μm. The dye-providing film was superposed on the resin-coated film such that the dye-containing layer faced the dye-receiving layer, and an electric voltage was applied to thermal printing heads from the back surface of the dye-providing film, whereby the dye in the dye-providing layer was sublimated and transferred onto the dye-receiving layer.

The heating time of the resistant elements of the thermal printing heads was 8 milli-seconds, the voltage was about 22 volts, and the maximum electric power was about 1.5 watts/dot.

The image-formed film obtained was allowed to stand in a hot blast dryer at 100° C. for 24 hours and the concentration change of the dye was determined. Also, a weight of 200 g was hung on the image-formed film, the assembly was allowed to stand in a toluene atmosphere for 24 hours, and the presence of the occurrence of fine craze on the surface was determined.

The results obtained are shown in Table 2 below.

EXAMPLES 7 TO 10

The same procedure as in Example 6 was followed except that the dihydric phenol compounds shown by formula (4) and formula (5) and the amounts thereof were changed as shown in Table 2 below.

The results obtained are shown in Table 2 below.

COMPARATIVE EXAMPLE 5

The same procedure as in Example 6 was followed except that 7.3 kg of BPA was used in place of 3.65 kg of BPA and 3.49 kg of TDP.

The results obtained are shown in Table 2 below.

COMPARATIVE EXAMPLE 6

(1) Production of Polycarbonate Oligomer:

In 1.8 liters of water was dissolved 1.6 kg of sodium hydroxide and while keeping the solution at 20° C., 3.65 kg of BPA and 4 g of HD were dissolved in the solution. To the solution was added 14 liters of MC and after further adding thereto 64 g of PTBP with stirring, 2.4 kg of PG was blown into the mixture over a period of 40 minutes. Only the MC solution containing the polycarbonate oligomer was collected. The analytical results of the MC solution of the oligomer obtained were as follows.

Oligomer Concentration (*1): 29.4% by weight
Terminal C1 Group Concentration (*2): 7.0%
Terminal Phenolic Hydroxy Group Concentration (*3): 0.01%

(*1): Measured by evaporating to dryness.
(*2): The aniline hydrochloride obtained by reacting with aniline was neutralization titrated with an aqueous solution of 0.2N NaOH.
(*3): Coloration in the case of dissolving in acetic acid solution of titanium tetrachloride was measured by a colorimetry at 546 nm.

The oligomer solution obtained by the above method is designated as oligomer solution A'.

(2) Production of Polycarbonate Oligomer:

By following the same procedure as in method (1) above except that 3.49 kg of 4,4'-dihydroxydiphenyl sulfide (TDP) was used in place of BPA, an MC solution of oligomer was obtained.

The analytical results of the MC solution of the oligomer were as follows.

Oligomer Concentration: 26.0% by weight

Terminal Cl Group Concentration: 7.0%

Terminal Phenolic Hydroxy Group Concentration: 0.01%

The oligomer solution obtained by the above method is designated as oligomer solution B'.

(3) Production of Block Copolymerized Polycarbonate:

Oligomer solution A', oligomer solution B', 4 liters of MC, and 20 g of PTBP were supplied into a reaction vessel. To the mixture were added 1.0 kg of sodium hydroxide and 18 liters of water, the reaction mixture was emulsified with stirring vigorously, and 8 g of TEA was then added to the emulsion followed by stirring for one hour to carry out the polymerization.

The polymer solution obtained was separated into an aqueous phase and an organic phase. The organic phase was collected and neutralized with phosphoric acid, and after repeating water washing until the washed water became neutral, 35 liters of isopropanol was added to the organic phase to precipitate the polymerized product. After recovering the precipitates by filtration and drying, a white powdery polycarbonate resin was obtained. The results of using the block copolymerized polycarbonate as the dye-receiving layer are shown in Table 2 below.

COMPARATIVE EXAMPLES 7 AND 8

The same procedure as in Example 6 was followed except that the amounts of BPA and TDP were changed as shown in Table 2 below.

The results obtained are shown in Table 2.

As described above, by using the polycarbonate resin solution of the present invention for forming a film of a thermal-sublimating dye-receiving layer, a dye-receiving layer comprising the polycarbonate resin having a high mechanical strength is obtained without losing the luster of the surface of the acceptor after transfer recording by thermal printing heads. Further, the polycarbonate resin in the present invention has a high solubility and the polycarbonate resin solution of the present invention for forming a thermal-sublimating dye-receiving layer film has the advantages that the resin solution is stable and excellent in productivity.

While the invention has been described in detail and with reference to specific embodiments thereof, it will be apparent to one skilled in the art that various changes and modifications can be made therein without departing from the spirit and scope thereof.

What is claimed is:

1. In a method for preparing a thermal transfer image-receiving sheet comprising a base sheet having formed thereon a thermal-sublimating dye-receiving layer, used in a thermal-sublimating dye transfer system, the improvement wherein a solution consisting essentially of a random copolycarbonate resin dissolved in a non-halogenated organic solvent in the form of a microdispersion is coated on the base sheet to form the thermal-sublimating dye-receiving layer, said random copolycarbonate resin having a structural unit represented by the following formula (1) and a structural formula represented by the following formula (2) or (3), the molar ratio of the structural unit represented by formula (1) to the structural unit represented by formula (2) or (3) being from 35/65 to 65/35, and having a number average molecular weight (Mn) of from 5,000 to 50,000;

TABLE 2

| | Dihydric Phenol*1 | | | Number Average | Film-Forming Property*2 | | | | | Heat Resistance*7 Density Holding |
|---|---|---|---|---|---|---|---|---|---|---|
| No. | Phenol of Formula (4) (mole %) | Phenol of Formula (5) (mole %) | Remarks | Molecular Weight × $10^4$ | Solubility (%) | Solution Stability*3 | Solution Turbidity*4 | Random Property*5 | Stress Crack*6 | Ratio at 100° C. for 24 hrs. (%) |
| EX 6 | BPA 50 | TDP 50 | | 1.0 | >20 | ∘ | ∘ | ∘ | ∘ | 93 |
| EX 7 | BPZ 60 | TDP 40 | | 3.2 | >20 | ∘ | ∘ | ∘ | ∘ | 92 |
| EX 8 | BPAP 60 | TDP 40 | | 0.7 | >20 | ∘ | ∘ | ∘ | ∘ | 85 |
| EX 9 | DMBPA 40 | TDP 60 | | 2.0 | >20 | ∘ | ∘ | ∘ | ∘ | 90 |
| EX 10 | BPA 50 | DMTDP 50 | | 2.0 | >20 | ∘ | ∘ | ∘ | ∘ | 89 |
| CE 5 | BPA 100 | | | 1.1 | <0.1 | — | x | — | x | 65 |
| CE 6 | BPA 50 | TDP 50 | Block Copolymer | 1.2 | >20 | x | ∘ | x | x | 60 |
| CE 7 | BPA 20 | TDP 80 | | 2.0 | >20 | — | x | x | ∘ | 70 |
| CE 8 | BPA 50 | TDP 50 | | 0.4 | >20 | ∘ | ∘ | ∘ | x | 65 |

EX Example
CE Comparison Example
(*1): Dihydric Phenols:
BPA: Same as in Table 1
BPZ: same as in Table 1
BPAP: Same as in Table 1
DMBPA: Same as in Table 1
TDP: Bis(4-hydroxyphenyl)sulfide
DMTDP: Bis(3-methyl-4-hydroxyphenyl)sulfide
(*2) to (*7): Same as in Table 1.

(1)

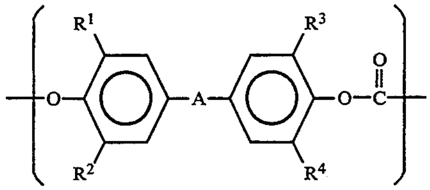

(2)

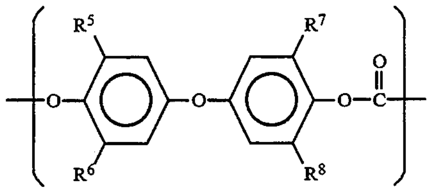

(3)

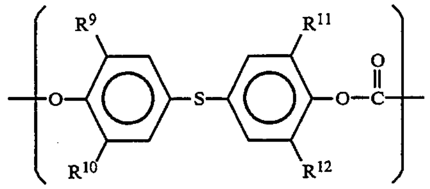

wherein $R^1$ to $R^{12}$ each represents a hydrogen atom, a halogen atom, or an alkyl group having from 1 to 4 carbon atoms and in formula (1), A represents a straight chain, branched, or cyclic alkylidene group having from 1 to 10 carbon atoms, an aryl-substituted alkylidene group, an arylene group, or a sulfonyl group.

2. The method as claimed in claim 1, wherein the structural unit represented by formula (1) is derived from a dihydric phenol compound represented by the following formula (4)

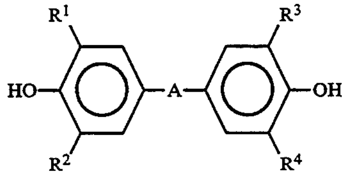

(4)

wherein $R^1$ to $R^4$ and A are the same as defined in claim 1.

3. The method as claimed in claim 2, wherein the dihydric phenol compound is at least one member selected from the group consisting of 2,2-bis(4-hydroxyphenyl)propane, 1,1-bis(4-hydroxyphenyl)cyclohexane, 1,1-bis(4-hydroxyphenyl)-1-phenyl ethane, 2,2-bis(4-hydroxy-3-methylphenyl)propane, and bis(4-hydroxyphenyl)sulfone.

4. The method as claimed in claim 1, wherein the structural unit represented by formula (2) is derived from a dihydric phenol compound represented by the following formula (5)

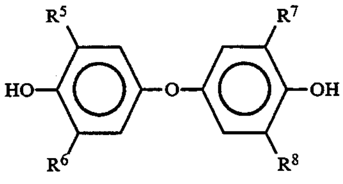

(5)

wherein $R^5$ to $R^8$ and A are the same as defined in claim 1.

5. The method as claimed in claim 4, wherein the dihydric phenol compound is at least one member selected from the group consisting of bis(4-hydroxyphenyl) ether, bis(3-methyl-4-hydroxyphenyl) ether, bis(3-bromo-4-hydroxyphenyl) ether, bis(3-chloro-4-hydroxyphenyl) ether, bis(3,5-dibromo-4-hydroxyphenyl) ether, and bis(3,5-dichloro-4-hydroxyphenyl) ether.

6. The method as claimed in claim 1, wherein the structural unit represented by formula (3) is derived from a dihydric phenol compound represented by the following formula (6)

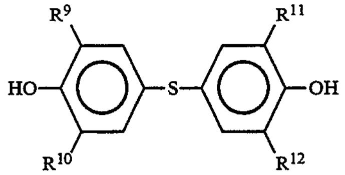

(6)

wherein $R^9$ to $R^{12}$ and A are the same as defined in claim 1.

7. The method as claimed in claim 6, wherein the dihydric phenol compound is at least one member selected from the group consisting of bis(4-hydroxyphenyl) sulfide, bis(3-methyl-4-hydroxyphenyl) sulfide, bis(3-bromo-4-hydroxyphenyl) sulfide, bis(3-chloro-4-hydroxyphenyl) sulfide, bis(3,5-dimethyl-4-hydroxyphenyl) sulfide, bis(3,5-dibromo-4-hydroxyphenyl) sulfide, and bis(3,5-dichloro-4-hydroxyphenyl) sulfide.

8. The method as claimed in claim 1, wherein the number average molecular weight of the random copolycarbonate is from 5,000 to 25,000.

9. The method as claimed in claim 1, wherein the concentration of the polycarbonate resin solution is from 1 to 30% by weight.

10. The method as claimed in claim 1, wherein the non-halogenated organic solvent is toluene.

11. The method as claimed in claim 1, wherein the dye-receiving layer has a thickness of from 1 to 50 $\mu m$.

12. The method as claimed in claim 1, wherein the solution is coated on the base film by a dip coating method or a flow coating method.

13. In a method for forming an image by transferring a thermal-sublimating dye from a thermal sublimating dye-containing layer to an image-receiving sheet, which image-receiving sheet is in face-to-face contact with the thermal-sublimating dye-containing layer, said image-receiving sheet comprising a base sheet having formed thereon a thermal-sublimating dye-receiving layer, the improvement wherein said thermal-sublimating dye-receiving layer is formed by coating a solution consisting essentially of a random copolycarbonate resin dissolved in a non-halogenated organic solvent in the form of a microdispersion is coated on the base sheet to form the thermal-sublimating dye-receiving layer, said random copolycarbonate resin having a structural unit represented by the following formula (1) and a structural formula represented by the following formula (2) or (3), the molar ratio of the structural unit represented by formula (1) to the structural unit represented by formula (2) or (3) being from 35/65 to 65/35, and having a number average molecular weight (Mn) of from 5,000 to 50,000;

-continued
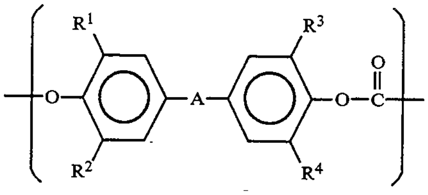
(1)
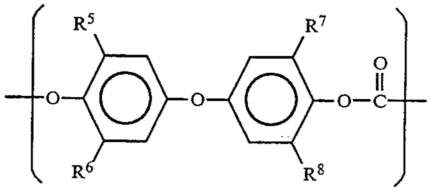
(2)
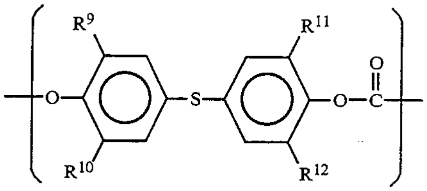
(3)
wherein $R^1$ to $R^{12}$ each represents a hydrogen atom, a halogen atom, or an alkyl group having from 1 to 4 carbon atoms and in formula (1), A represents a straight chain, branched, or cyclic alkylidene group having from 1 to 10 carbon atoms, an aryl-substituted alkylidene group, an arylene group, or a sulfonyl group.
* * * * *